United States Patent
Randazzo

(10) Patent No.: US 7,269,887 B2
(45) Date of Patent: Sep. 18, 2007

(54) METHOD OF MAKING APPLIQUE FOR PILLAR AREA OF VEHICLE

(75) Inventor: Joseph J. Randazzo, Fraser, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 11/364,091

(22) Filed: Mar. 1, 2006

(65) Prior Publication Data

US 2006/0145496 A1 Jul. 6, 2006

Related U.S. Application Data

(62) Division of application No. 10/785,196, filed on Feb. 25, 2004, now Pat. No. 7,083,212, which is a division of application No. 09/841,192, filed on Apr. 25, 2001, now Pat. No. 6,740,390.

(51) Int. Cl.
*B23P 25/00* (2006.01)
*B60J 10/02* (2006.01)

(52) U.S. Cl. ............ 29/458; 29/527.2; 264/260; 264/271.1; 264/279

(58) Field of Classification Search ........... 296/1.08, 296/84.1, 93, 146.1, 146.2, 146.7, 146.9, 296/146.15; 428/122, 217; 49/490.1; 29/458, 29/527.2; 264/259, 260, 261, 263, 271.1, 264/279
See application file for complete search history.

(56) References Cited

U.S. PATENT DOCUMENTS

| | | | |
|---|---|---|---|
| 4,505,511 A * | 3/1985 | Hanle et al. ............ 296/93 |
| 4,653,801 A | 3/1987 | Shirasu et al. | |
| 4,699,419 A | 10/1987 | Kawase et al. | |
| 4,736,981 A | 4/1988 | Barton et al. | |
| 4,765,677 A * | 8/1988 | Nagata ............ 296/216.09 |
| 4,858,988 A * | 8/1989 | Morgan et al. ............ 296/201 |
| 4,864,786 A * | 9/1989 | Harris, Jr. ............ 52/214 |
| 4,891,913 A * | 1/1990 | Shimura et al. ............ 49/493.1 |
| 4,925,237 A * | 5/1990 | Bohn et al. ............ 296/216.09 |
| 4,950,019 A * | 8/1990 | Gross ............ 296/93 |
| 5,050,928 A * | 9/1991 | Bohm et al. ............ 296/216.09 |
| 5,056,850 A | 10/1991 | Katcherian et al. | |
| 5,092,078 A * | 3/1992 | Keys ............ 49/441 |

(Continued)

FOREIGN PATENT DOCUMENTS

JP 6-22107 3/1994

OTHER PUBLICATIONS

U.S. Appl. No. 10/785,196, filed Feb. 25, 2004.

(Continued)

*Primary Examiner*—Essama Omgba
(74) *Attorney, Agent, or Firm*—Nixon & Vanderhye P.C.

(57) ABSTRACT

A pillar applique for use at a pillar area (e.g., A-pillar area) of a vehicle. The pillar applique includes a substrate portion and a thermoplastic elastomer portion. Each of the substrate portion (21) and the thermoplastic elastomer portion (23) are formed via injection molding in certain embodiments of the invention, and the thermoplastic elastomer portion may be injection molded over the substrate portion during its forming process (or vice versa) so that the two portions may be bonded to one another without the need for additional adhesive.

2 Claims, 5 Drawing Sheets

U.S. PATENT DOCUMENTS

| | | | |
|---|---|---|---|
| 5,343,609 A * | 9/1994 | McManus | 29/451 |
| 5,475,947 A | 12/1995 | Dupuy | |
| 5,544,933 A | 8/1996 | Shahab et al. | |
| 5,720,510 A | 2/1998 | Daniel et al. | |
| 5,743,047 A | 4/1998 | Bonne et al. | |
| 5,833,303 A | 11/1998 | Kawai et al. | |
| 6,007,753 A * | 12/1999 | Nagata | 264/138 |
| 6,023,888 A | 2/2000 | Dover | |
| 6,065,800 A | 5/2000 | Olson | |
| 6,099,779 A * | 8/2000 | Brandner et al. | 264/242 |
| 6,103,168 A | 8/2000 | Kelly | |
| 6,402,874 B1 * | 6/2002 | Kelly | 156/245 |
| 6,409,256 B1 | 6/2002 | Page | |
| 6,416,113 B1 | 7/2002 | Page | |
| 6,740,390 B2 | 5/2004 | Randazzo | |
| 6,966,601 B2 | 11/2005 | Matsumoto et al. | |
| 7,083,212 B2 * | 8/2006 | Randazzo | 296/1.08 |
| 7,086,201 B2 * | 8/2006 | Struyven et al. | 49/502 |
| 2002/0178656 A1 * | 12/2002 | Nozaki et al. | 49/441 |
| 2003/0170460 A1 | 9/2003 | Sienkiewicz et al. | |
| 2005/0189780 A1 | 9/2005 | Hara et al. | |
| 2005/0249900 A1 * | 11/2005 | Barre et al. | 428/35.7 |

OTHER PUBLICATIONS

Status of the New Injection Molded "A" Pillar Molding as of Feb. 27, 2000 (1 page).

Email dated Sep. 23, 1999 re New A Pillar Molding status as of Sep. 23 (1 page).

Chrysler Corp. 2000 WJ Drawing, Part #5513725CAA/51AA (1 page) (2000).

* cited by examiner

METHOD OF MAKING APPLIQUE FOR PILLAR AREA OF VEHICLE

This application is a divisional of application Ser. No. 10/785,196 filed Feb. 25, 2004 now U.S. Pat. No. 7,083,212, which is a divisional of 09/841,192 filed Apr. 25, 2001 (now U.S. Pat. No. 6,740,390), the entire contents of which are hereby incorporated herein by reference in this application.

This invention relates an applique for a pillar area of a vehicle. More particular, this invention relates to a multi-component polymer based applique for an A-pillar area of a vehicle such as a car, pick-up truck, minivan, or sport utility vehicle (SUV).

BACKGROUND OF THE INVENTION

An applique is a decorative member or cover which is fastened to a vehicle surface or structure to add styling, to functionally cover aesthetically non-pleasing portions of a vehicle, and/or to create a sort of weather seal. Conventional appliques are made of metal and/or plastic. For example, it is known to apply appliques over the external A-pillar areas of a vehicle. While the applique may be attached directly to the A-pillar itself, it is also possible to attach an A-pillar applique to door sheet metal or some other structure so that the applique is not directly contacting the pillar itself A pillar is known in the art as a structural member provided to support the structure of a vehicle.

FIG. 1 illustrates a conventional automobile. The vehicle of FIG. 1 includes front and rear assemblies 1 and 3 having front and rear windows 5 and 7, respectively. The vehicle A-pillar area, generally designated by reference numeral 11, is located at least partially between the front door and the windshield. Meanwhile, the vehicle B-pillar is generally designated by reference numeral 9, and the vehicle C-pillar is generally designated by reference numeral 13.

Because of the high visibility of the A-pillar areas, appliques are commonly used to provide an aesthetically pleasing surface and/or seal on or proximate the A-pillar. Such appliques are used, for example, to cover manufacturing imperfections, create a seal adjacent the door and/or windshield, or the like.

Conventional A-pillar appliques typically include a substrate which supports a flexible thermoplastic elastomer. In making conventional A-pillar appliques, the thermoplastic elastomer portion of the applique is often co-extruded onto the metal substrate portion of the applique, with the co-extruded part thereafter being bent and/or cut into the desired shape. Unfortunately, this tends to be a very costly process.

Other conventional A-pillar appliques are manufactured by gluing the thermoplastic elastomer portion to the metal substrate using a separate adhesive layer. Unfortunately, such processes require the extra glue and/or adhesive, and sometimes tend to be messy and/or more costly.

In view of the above, it will be apparent to those skilled in the art that there exists a need for a more efficient and/or easy-to-manufacture applique for pillar areas (e.g., A-pillar areas) of a vehicle(s).

SUMMARY OF THE INVENTION

An object of this invention is to provide an applique for a pillar area of a vehicle. The applique may be used at A-pillar areas of the vehicle, or at other pillar areas of a vehicle in alternative embodiments.

Another object of this invention is to provide a pillar applique including first and second different polymer based materials, one injection molded to the other during the manufacturing process. Thus, a separate adhesive is not needed between the two polymer based materials of the pillar applique.

Another object of this invention is to provide a pillar applique including a substrate portion and a thermoplastic elastomer portion. Each of the substrate portion and the thermoplastic elastomer portion are formed via injection molding in certain embodiments of the invention, and the thermoplastic elastomer portion may be injection molded over the substrate portion during its forming process (or vice versa) so that the two portions may be bonded to one another without the need for additional adhesive.

Another object of this invention is to fulfill one or more of the above listed objects.

Generally speaking, certain example embodiments of this invention fulfill one or more of the above-listed needs by providing an applique for use at a pillar area of a vehicle, the applique comprising:

an injection molded substrate including nylon and propylene;

an injection molded flexible thermoplastic elastomer portion including at least one flexible lip or leg for engaging a surface or edge of a vehicle window, and wherein said substrate and said thermoplastic elastomer portion are bonded together during an injection molding step; and wherein said thermoplastic elastomer portion and said substrate are of different materials having different hardness values which are selected so that the thermoplastic elastomer portion and the substrate are molded or bonded to one another during the injection molding step without a separate adhesive layer therebetween.

Certain other embodiments of this invention fulfill one or more of the above-listed objects by providing a method of making a vehicle pillar applique, the method comprising:

a) injection molding one of: 1) a polymer inclusive substrate, and 2) a thermoplastic elastomer portion;

b) in a subsequent injection molding step, injection molding the other of 1) said polymer inclusive substrate, and 2) said thermoplastic elastomer portion, to the one injection molded in step a); and c) attaching the applique to a vehicle proximate a pillar area thereof.

DETAILED DESCRIPTION OF CERTAIN EMBODIMENTS OF THIS INVENTION

Figure 1:
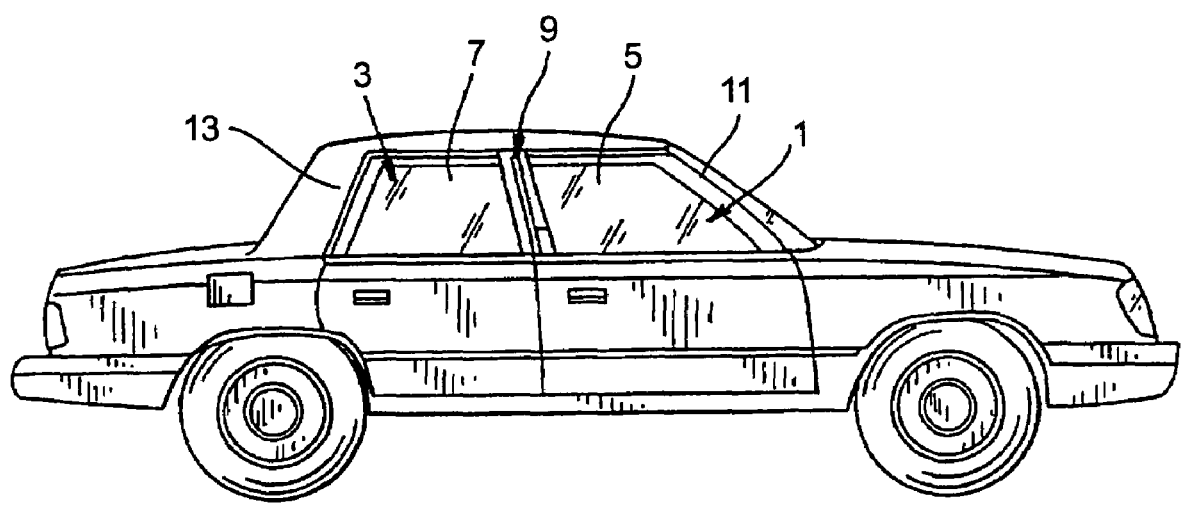
FIG. 1 is a side plan view of a conventional vehicle.

Referring now more particularly to the accompanying drawings in which like reference numerals indicate like parts throughout the several views.

Figure 2:
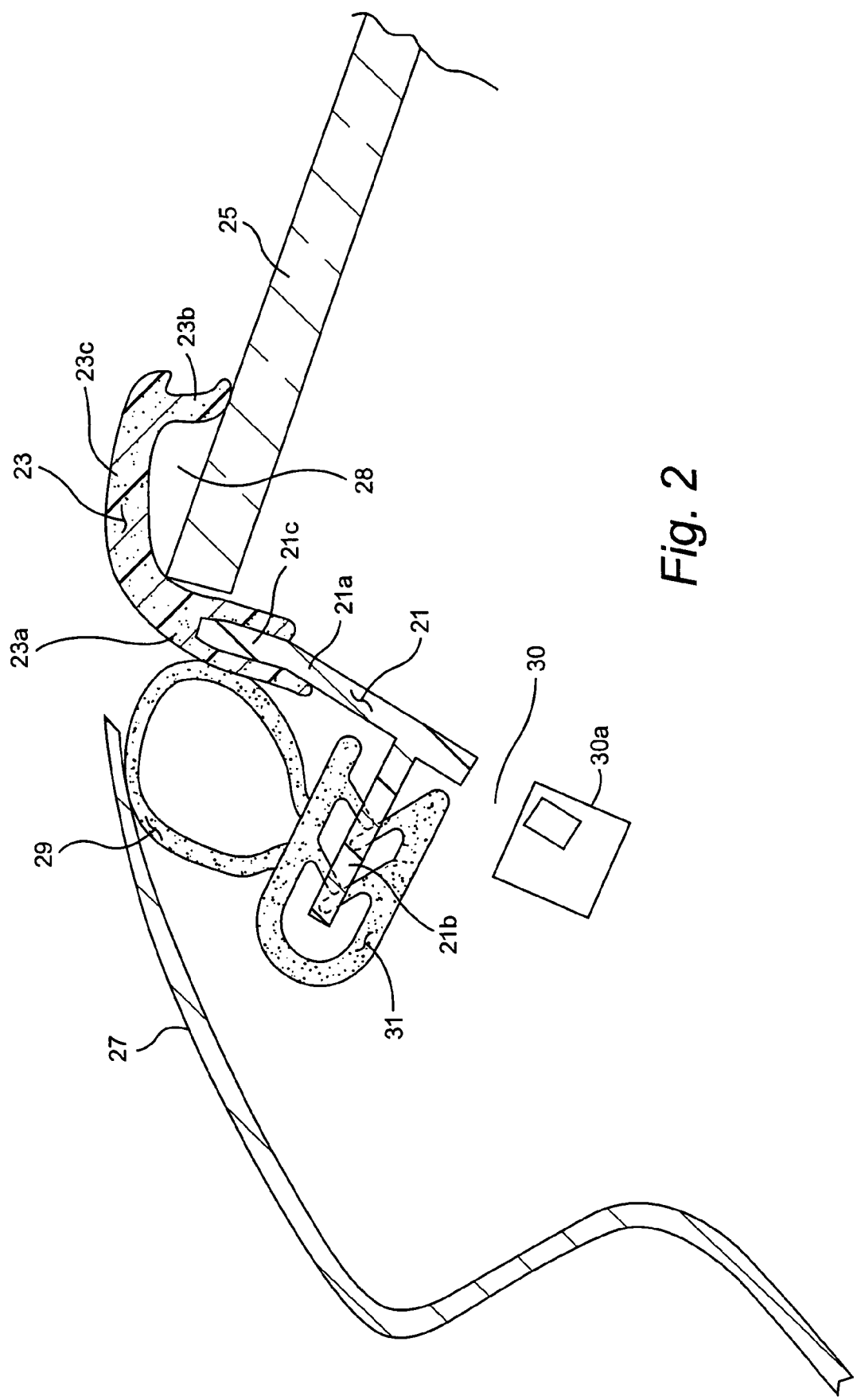
FIG. 2 is a cross-sectional view of an exemplary A-pillar applique according to an embodiment of this invention.

FIG. 2 is a cross-sectional view of an A-pillar applique according to an embodiment of this invention. The applique includes polymer inclusive substrate (or carrier) 21 and thermoplastic elastomer 23. Elastomer portion 23 of the applique is supported by substrate 21. Also shown in FIG. 2 are vehicle glass windshield 25, vehicle front door 27 (e.g., of or including sheet metal), bulb seal 29 for providing a weather seal between the applique and door 27, and U-shaped seal carrier 31 which supports bulb seal 29.

A-pillar applique substrate 21 includes base portion 21a, projection 21b, and distal end portion 21c which supports elastomer portion 23. Projection 21b extends at an angle approximately perpendicular (i.e., perpendicular plus/minus 15 degrees) from base 21a. A large portion of base 21a is approximately flat or planar, while distal end portion 21c angles upwardly at an angle from about 1-40 degrees, more preferably from about 2-15 degrees, relative to base 21a. Thermoplastic elastomer portion 23 of the applique is supported by at least distal end 21c of the substrate 21. In particular, an approximately U-shaped end of elastomer portion 23 encompasses or fits around distal end 21c of applique substrate 21, so that the elastomer 23 is supported by the substrate 21. Thus, a portion of end 21c fits into a channel defined between the two legs of the U-shaped end portion 23a of the elastomer portion 23.

Elastomer portion 23 of the applique includes U-shaped connection portion 23a which is attached to substrate 21, flexible lip 23b which forms a water seal with the exterior surface of vehicle windshield 25, and curved body portion 23c. Curved body 23c of the applique elastomer portion 23 is located between and supports both flexible lip 23b and attachment portion 23a. Together, the interior sides/surfaces of portions 23a-23c form an approximately U-shaped cavity 28 on the side of the elastomer portion 23 facing the exterior surface of windshield 25.

Additionally, and still referring to FIG. 2, approximately U-shaped seal carrier 31 is attached to and supported by projection 21b of applique substrate 21. In particular, projection 21b extends into the channel defined between the opposing legs of the carrier 31. Bulb seal 29 is in contact with and supported by carrier 31, so that seal 29 provides a water or weather seal between door 27, carrier 31, and the elastomer portion 23 of the applique. In certain embodiments of this invention, substrate 21 of the applique is attached at 30 to the A-pillar itself or some other attachment mechanism 30a.

Figure 3:
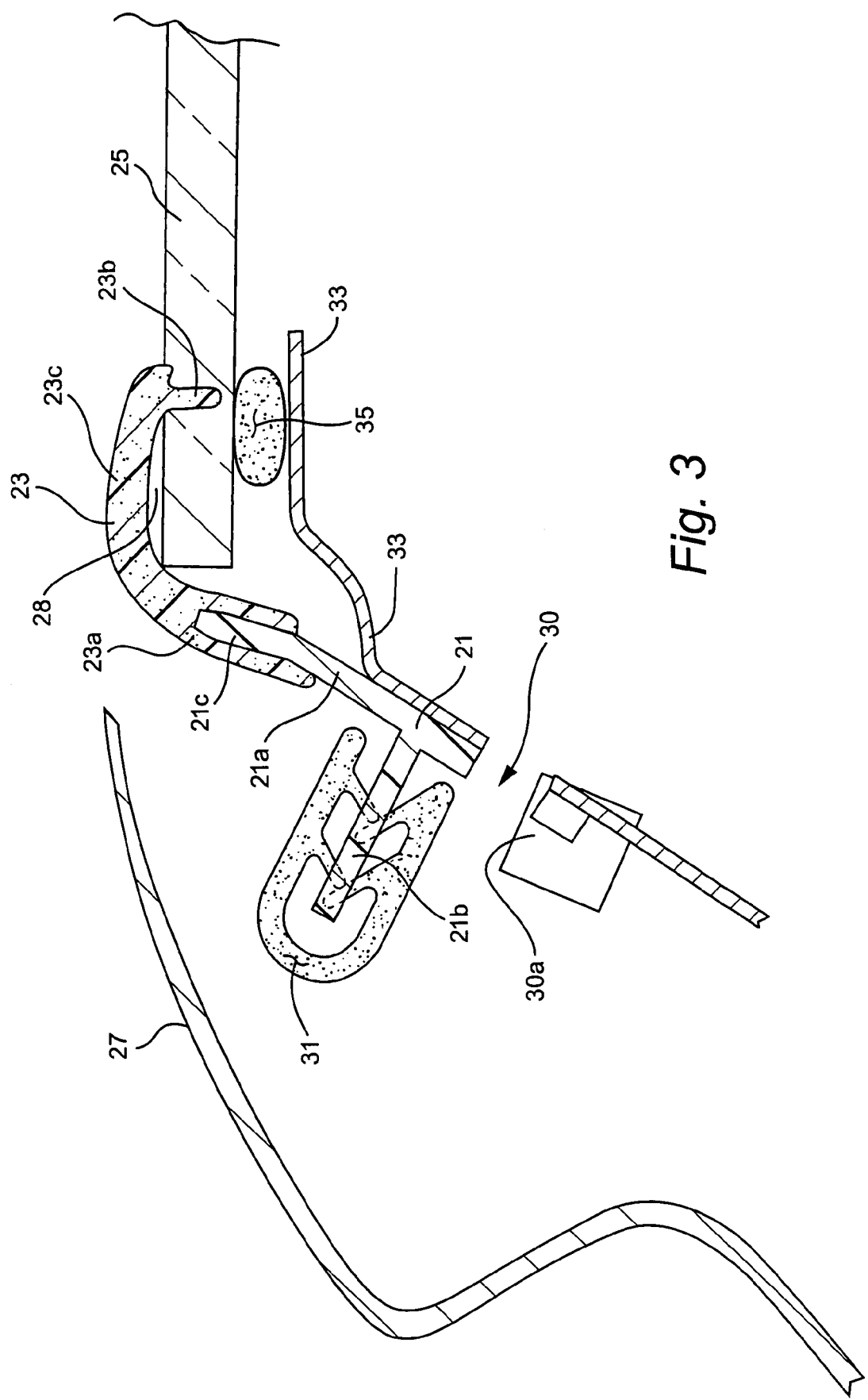
FIG. 3 is a cross-sectional view of an exemplary A-pillar applique according to another embodiment of this invention.

FIG. 3 is a cross-sectional view of an A-pillar applique according to another embodiment of this invention. This FIG. 3 embodiment differs from the FIG. 2 embodiment, in that in FIG. 3 bodyside sheet metal 33 and/or urethane inclusive flexible seal 35 are provided. Optionally, a bulb seal 29 (not shown in FIG. 3) may also be provided on carrier 31. The applique shape in FIG. 3 also differs to some minor degree verses that of FIG. 2.

Figure 4:
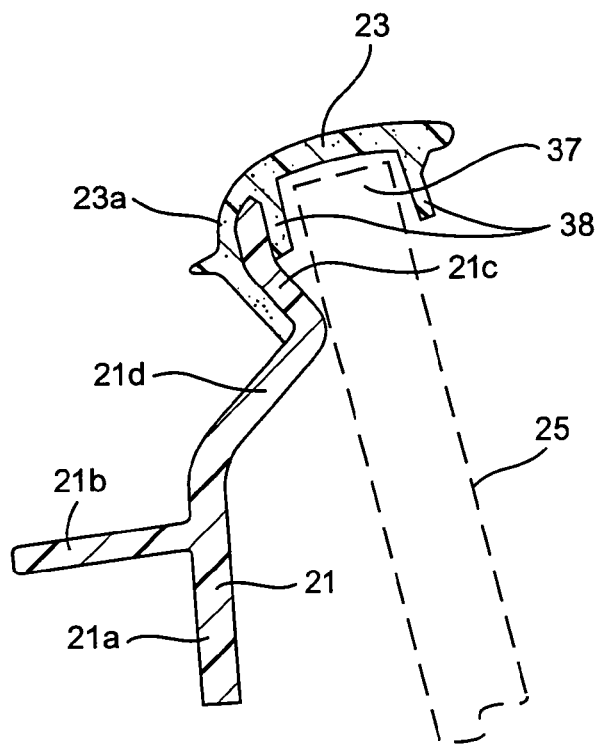
FIG. 4 is a cross-sectional view of an A-pillar applique according to another embodiment of this invention.
Figure 5:
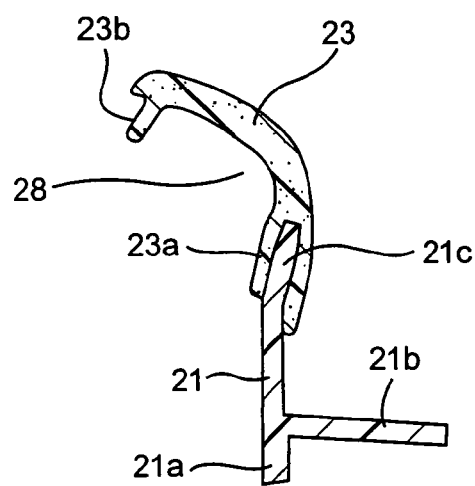
FIG. 5 is a cross-sectional view of an A-pillar applique according to yet another embodiment of this invention.
Figure 6:
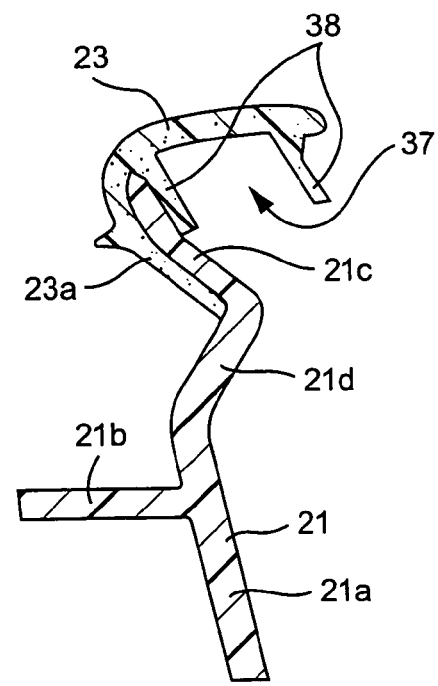
FIG. 6 is a cross-sectional view of an A-pillar applique according to still another embodiment of this invention.

FIGS. 4-6 are cross-sectional views of A-pillar appliques according to other embodiments of this invention. In each case, a flexible thermoplastic elastomer portion 23 is provided in direct contact with a substrate portion 21 of the applique. The FIG. 5 embodiment is similar to the embodiments of FIGS. 2-3. However, each of the FIG. 4 embodiment and the FIG. 6 embodiment differ from FIGS. 2-3 in that they include a channel or cavity 37 formed between two extending approximately parallel flexible legs 38. The term "approximately parallel" as used herein means parallel plus/minus approximately 15 degrees. Cavity 37 in the FIG. 4 embodiment and the FIG. 6 embodiment is adapted to receive an edge of vehicle windshield 25 as shown by the dotted lines in FIG. 4. Moreover, in the FIG. 4 and 6 embodiments, substrate 21 includes an additional angled portion 21d which is located between bent distal end portion 21c and base portion 21a. In the FIG. 4 and 6 embodiments, angled portion 21d forms an angle with base portion 21a of from about 10-80 degrees, more preferably from about 25-60 degrees. Also, angled portion 21d forms an angle with distal end portion 21c of from approximately 70-120 degrees, more preferably from about 80-100 degrees.

In preferred embodiments of this invention, applique substrate 21 (see FIGS. 2-6) is made of or includes a blend and/or alloy including nylon and propylene (e.g., polypropylene or any other suitable type of propylene). One example alloy or blend for substrate 21 is NYLEX available from MultiBase Company, located in Troy, Mich. Meanwhile, elastomer portion 23 of the applique is also polymer based, but in certain preferred embodiments includes or is made of a less hard material such as styrene ethylene block copolymer elastomer. The thermoplastic material selected for elastomer portion 23 is special in that it in combination with the material of substrate 21 enables portions 21 and 23 of the applique to be joined to one another during an injection mold process without the need for any additional adhesive therebetween. This represents a significant advantage over the prior art. It will be recognized by those skilled in the art that the materials listed above for applique portions 21 and 23 are for purposes of example only, and are not intended to be limiting. Other materials may instead be used, so long as the materials are compatible with one another by enabling the two portions to be bonded to one another without the need for additional adhesive therebetween.

Figure 7:
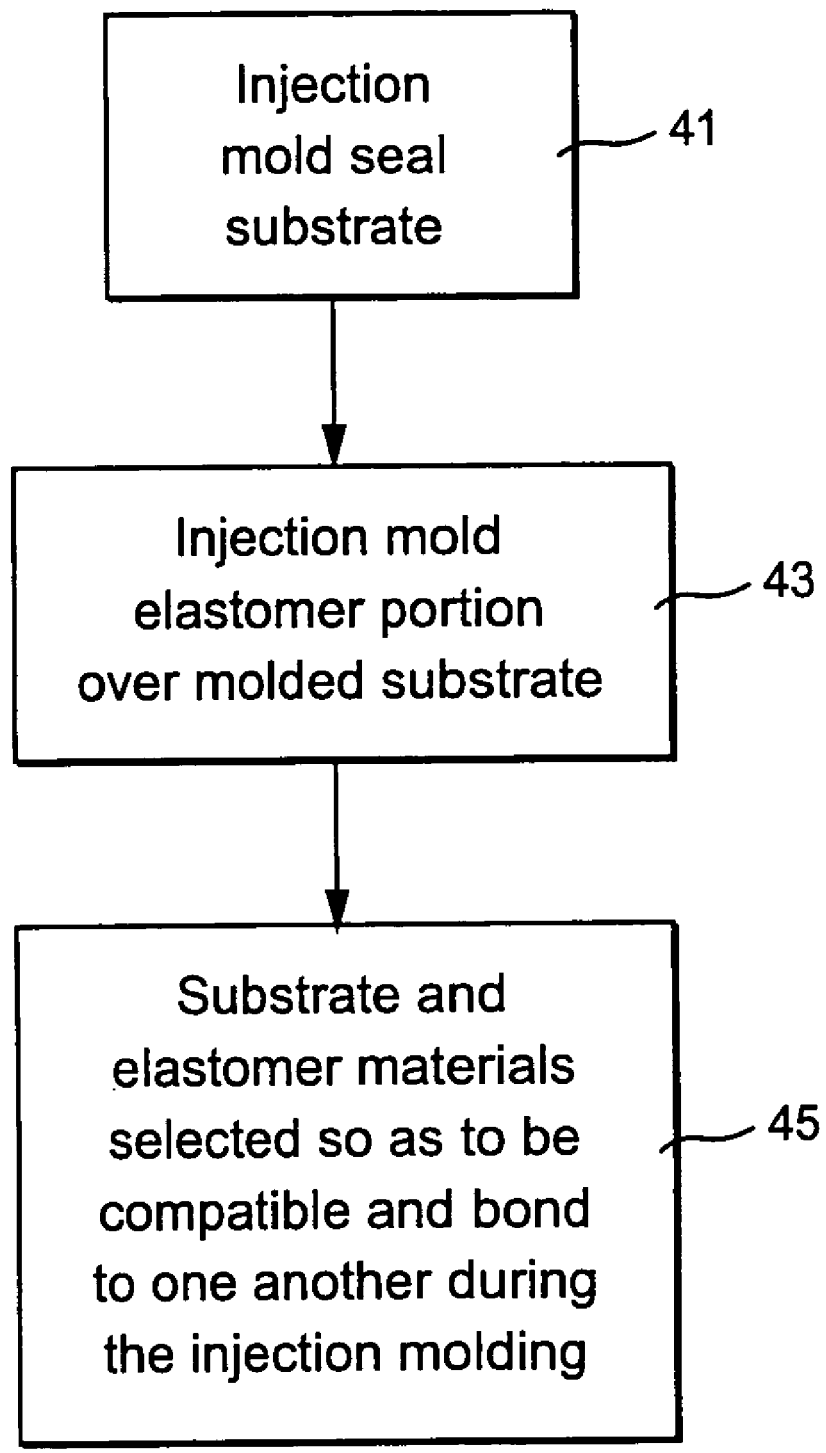
FIG. 7 is a flowchart illustrating steps taken during the manufacture of an example pillar applique according to an embodiment of this invention.

FIG. 7 is a flow chart illustrating how exemplary appliques are made according to an embodiment of this invention. First, in step 41, substrate 21 is formed via an injection molding process using conventional injection molding techniques. In particular, molten or semi-molten flowable nylon/propylene blend is injected into the mold including at least two dies so as to form substrate 21. Thereafter, elastomer portion 23 is to be injection molded onto or over the pre-formed substrate 21. In one example embodiment, one of the two dies used in step 41 is removed and replaced with another larger die to be used in conjunction with the remaining die from step 41. Then, the thermoplastic elastomer is injected into the cavity between the two dies in step 43 in order to mold the elastomer portion 23 directly to substrate 21. Substrate 21 may or may not be permitted to fully cure between steps 41 and 43, in different embodiments of this invention.

Because of the special materials selected for components 21 and 23 of the applique (see discussion above), the elastomer portion 23 may be molded directly to substrate 21 in step 43 without the need for additional adhesive therebetween (see step 45). Thereafter, the injection molded device is opened and the resulting applique is removed therefrom. The applique, including substrate 21 and thermoplastic elastomer portion 23, may then be installed on a vehicle at a pillar area (e.g., A-pillar area) as shown in any of FIGS. 2-4.

In certain preferred embodiments of this invention, substrate 21 and thermoplastic elastomer portion 23 are both polymer based, both formed via injection molding, but have different durometers. For example, elastomer portion 23 may have a durometer from about 70-90, while substrate portion 21 may have a higher durometer of, for example, at least 100. Thus, portions 2 is less hard and more flexible than substrate 21.

Once given the above disclosure, many other features, modifications, and improvements will become apparent to the skilled artisan. Such other features, modifications, and improvements are therefore considered to be a part of this invention, the scope of which is to be determined by the following claims.

The invention claimed is:

1. A method of making a vehicle pillar appliqué for use on a vehicle, the method comprising:
   a) injection molding one of: 1) a polymer inclusive substrate, and 2) a thermoplastic elastomer portion;
   b) in a subsequent injection molding step, injection molding the other of 1) said polymer inclusive substrate, and 2) said thermoplastic elastomer portion, to the one injection molded in step a), in order to form the appliqué which includes the polymer inclusive substrate and the thermoplastic elastomer portion molded to each other;
   c) selecting durometer values for the thermoplastic elastomer portion and the polymer inclusive substrate, so that the polymer inclusive substrate has a higher durometer and is less flexible than the thermoplastic elastomer portion; and
   d) attaching the applique formed in b) to the vehicle proximate a pillar area thereof in a manner so that the polymer inclusive substrate of the appliqué includes an interior surface to be closest to a vehicle window and an exterior surface to be further from the window than is the interior surface, and wherein at least part of the interior surface of the polymer inclusive substrate is for facing a peripheral edge of the vehicle window and the thermoplastic elastomer portion is at least bonded to at least part of an interior surface of the polymer inclusive substrate facing the peripheral edge of the vehicle window so that the at least part of the thermoplastic elastomer portion is provided between the peripheral edge of the vehicle window and the interior surface of the polymer inclusive substrate.

2. The method of claim 1, wherein the thermoplastic elastomer portion and the substrate are molded or bonded to one another during the injection molding step b) without a separate adhesive layer therebetween.

* * * * *